US012024644B2

United States Patent
Walia et al.

(10) Patent No.: US 12,024,644 B2
(45) Date of Patent: Jul. 2, 2024

(54) SEALANT COMPOSITION

(71) Applicant: Dow Global Technologies LLC, Midland, MI (US)

(72) Inventors: Parvinder S. Walia, Midland, MI (US); George A. Klumb, Midland, MI (US); Jack E. Hetzner, Reese, MI (US)

(73) Assignee: Dow Global Technologies LLC, Midland, MI (US)

( * ) Notice: Subject to any disclaimer, the term of this patent is extended or adjusted under 35 U.S.C. 154(b) by 510 days.

(21) Appl. No.: 17/282,851

(22) PCT Filed: Oct. 15, 2019

(86) PCT No.: PCT/US2019/056246
§ 371 (c)(1),
(2) Date: Apr. 5, 2021

(87) PCT Pub. No.: WO2020/091991
PCT Pub. Date: May 7, 2020

(65) Prior Publication Data
US 2021/0347997 A1    Nov. 11, 2021

Related U.S. Application Data

(60) Provisional application No. 62/752,736, filed on Oct. 30, 2018.

(51) Int. Cl.
*C09D 5/00* (2006.01)
*B29C 44/12* (2006.01)
(Continued)

(52) U.S. Cl.
CPC .............. *C09D 5/002* (2013.01); *B29C 44/12* (2013.01); *C09D 5/021* (2013.01); *C09D 7/45* (2018.01);
(Continued)

(58) Field of Classification Search
None
See application file for complete search history.

(56) References Cited

U.S. PATENT DOCUMENTS 5,723,182 A    3/1998  Choi et al.
6,401,643 B2   6/2002  Iida
                       (Continued)

FOREIGN PATENT DOCUMENTS

CN     102010680 A    4/2011
EP      1944342 A1    7/2008
(Continued)

OTHER PUBLICATIONS

PCT/US2019/056246, International Search Report and Written Opinion with a mailing date of Jan. 10, 2020.
(Continued)

*Primary Examiner* — Chinessa T. Golden
(74) *Attorney, Agent, or Firm* — Arthur R. Rogers (57) ABSTRACT

A process for producing a sealed stitched skin structure including the steps of: (a) providing a stitched skin member; (b) providing an aqueous thermoplastic polyolefin dispersion sealant coating composition; (c) applying the aqueous thermoplastic polyolefin dispersion sealant coating composition from step (a) to at least a portion of the surface of at least one side of the skin member to form a wet film or coating of the thermoplastic polyolefin dispersion sealant coating composition on the surface of the skin member; (d) drying the wet coating from step (c) on the skin member surface; and (e) heating the dried skin member from step (d) at a temperature sufficient to form a film or coating of the aqueous thermoplastic polyolefin dispersion sealant coating composition on the stitches of the seam in the skin member; wherein the film or coating seals the stitches in the skin
(Continued)

member; a sealed stitched skin structure made by the process above; and a polyurethane foamed article.

5 Claims, 3 Drawing Sheets

(51) Int. Cl.
| | |
|---|---|
| *C09D 5/02* | (2006.01) |
| *C09D 7/45* | (2018.01) |
| *C09D 7/65* | (2018.01) |
| *C09D 123/08* | (2006.01) |
| *C09D 153/00* | (2006.01) |
| *C09D 175/04* | (2006.01) |
| *B29K 75/00* | (2006.01) |
| *B29L 31/30* | (2006.01) |

(52) U.S. Cl.
CPC ......... *C09D 7/65* (2018.01); *C09D 123/0815* (2013.01); *C09D 153/00* (2013.01); *C09D 175/04* (2013.01); *B29K 2075/00* (2013.01); *B29L 2031/3005* (2013.01)

(56) References Cited

U.S. PATENT DOCUMENTS

| | | |
|---|---|---|
| 6,789,592 B2 | 9/2004 | Biro et al. |
| 7,763,676 B2 | 7/2010 | Moncla et al. |
| 7,803,865 B2 | 9/2010 | Moncla et al. |
| 9,278,500 B2 | 3/2016 | Filipp |
| 2007/0141933 A1 | 6/2007 | Wevers et al. |
| 2015/0321449 A1 | 11/2015 | Faurecia |
| 2016/0318461 A1 | 11/2016 | Bergers et al. |

FOREIGN PATENT DOCUMENTS

| | | | | |
|---|---|---|---|---|
| GB | 2346624 A | 8/2000 | | |
| WO | 2002/006578 A1 | 1/2002 | | |
| WO | 2005085331 A1 | 9/2005 | | |
| WO | 2009/097166 A1 | 8/2009 | | |
| WO | 2016/148897 A1 | 9/2016 | | |
| WO | WO-2016148897 A1 * | 9/2016 | ............... | B05D 1/02 |
| WO | 2016/160228 A1 | 10/2016 | | |

OTHER PUBLICATIONS

PCT/US2019/056246, International Preliminary Report on Patentability with a mailing date of May 14, 2021.

Office Action from corresponding Chinese Application: 201980070514.5 with a mailing date of May 5, 2023.

Office Action from corresponding Chinese 201980070514.5 application, dated Nov. 4, 2022.

* cited by examiner

SEALANT COMPOSITION

FIELD

The present invention relates to a sealant composition; and more specifically, the present invention relates to a sealant composition which is derived from an aqueous polyolefin dispersion.

BACKGROUND

Figure 1:
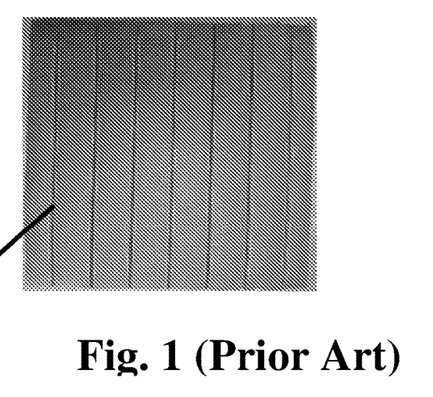
FIG. 1 is a photograph showing a skin of the prior art having no PU leakage.
Figure 1A:
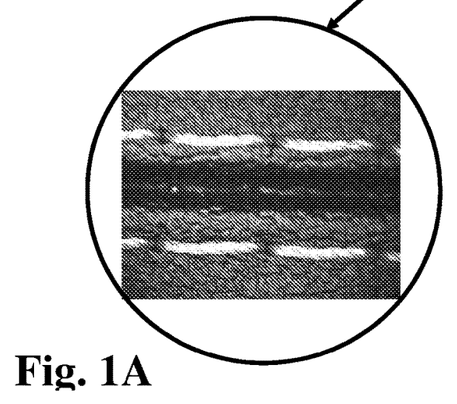
FIG. 1A is an enlarged photograph showing the seam stitching of the foamed stitched skin of FIG. 1 with of a good seal.
Figure 2:
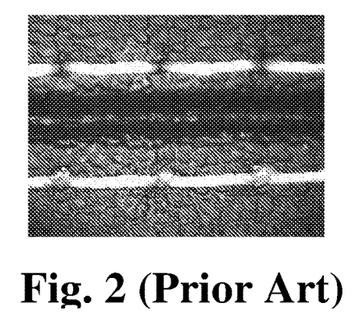
FIG. 2 is a photograph showing a skin of the prior art having PU leakage.

Stitched skins for automotive interior applications like instrument panels (IPs), door panels (DP), trim and seating is a growing trend for craftsmanship. Visible stitching, sewn or simulated is perceived as luxurious. Stitching features are reminiscent of hand-crafted materials such as leather upholstery. These skins are typically back-foamed for soft touch with polyurethane (PU) foam. The presence of the needle holes from the stitching provides a pathway for the PU foam to leak out (or "bleed out") through the needle holes during molding as shown in the photographs of FIGS. 1, 1A, and 2 (prior art). There is a growing trend of using stitched skins in automotive interiors; and a solution to the problem of PU foam leakage would be advantageous in the current automotive industry.

One typical way to solve the PU foam leakage problem is to apply seam tape to seal the seam stitch holes to prevent PU foam from leaking through the needle holes. In the textile industry, seam tape with an adhesive backing is well known; and various seam tape compositions are also known. However, applying a seam tape to a skin surface is a labor-intensive method (e.g., anywhere from 6-8 people per shift are needed for applying seam tape to a skin member) for sealing needle holes; and this labor-intensive seam tape application method can be a costly method to use. In addition, the seam tape application process of the prior art is disadvantaged because:

(1) The seam tape is applied manually on a stitching machine along with hot melt adhesive at ~150 degrees Celsius (° C.).

(2) The seam tape is difficult to apply in complex geometries, especially corners, leading to a high degree of failure. For instance, seam tape tends to wrinkle and/or crease, and the seam tape is difficult to apply in corners and sharp radii areas. Even in flat areas, a slight turn in a stitch may require the use of multiple pieces of tape to follow the turn.

(3) The application of the seam tape requires an operator to turn the skin inside out to apply the seam tape adding time and cost to the method; and creating a high potential of damaging the skin materials being stitched.

(4) When using sealing tape, there is a high risk that the edges of the tape may become visible after PU foaming.

(5) A high scrap rate in IPs is being reported by molders that make automotive interior parts like instrument and door panels due to the inefficient sealing of the tape or the visual defects of the seal.

If an adhesive material, such as radically curing acrylates, cationic epoxy adhesives, ultra violet light (UV) acrylates, and PU adhesives are used with the above seam tape application, such prior art processes require a curing step in the process which adds to the complexity and cost of the seam sealing process.

Heretofore, a wide variety of materials and methods have been used to provide a seal to a stitched seam including, for example, the sealants and processes described in WO2002006578A1; U.S. Patent Application Publication No. US20160318461A1; U.S. Pat. No. 9,278,500B2; U.S. Pat. No. 5,723,182; EP1944342B1; U.S. Pat. No. 6,789,592B2; U.S. Pat. No. 6,401,643; and GB2346624A. However, in spite of the recent developments in seam sealing, there is still a desire in the industry for an automated process with improved sealing of seam stitch holes to prevent PU foam from leaking through the needle holes.

SUMMARY

In one embodiment, the present invention is directed to a process for producing a sealed stitched skin structure including the steps of: (a) providing a stitched skin member; (b) providing an aqueous thermoplastic polyolefin dispersion sealant coating composition; (c) applying the aqueous thermoplastic polyolefin dispersion sealant coating composition from step (a) to at least a portion of the surface of at least one side of the skin member to form a wet film or coating of the thermoplastic polyolefin dispersion sealant coating composition on the surface of the skin member; (d) drying the wet coating from step (c) on the skin member surface at a temperature of from 50° C. to 100° C.; and (e) heating the dried skin member from step (d) at a temperature sufficient to form a film or coating of the aqueous thermoplastic polyolefin dispersion sealant coating composition on the stitches of the seam in the skin member; wherein the film or coating seals the stitches in the seam in the skin member.

In another embodiment, the present invention is directed to a sealed stitched skin structure made by the process above.

In still another embodiment, the present invention relates to a polyurethane foamed article and a process of making the polyurethane foamed article.

The present invention advantageously provides a sealant coating composition which is derived from an aqueous polyolefin dispersion. The aqueous dispersion sealant coating composition, when applied to a stitched soft skin structure having stitched holes, forms a film or coating that seals the stitched holes present in the stitched skins. In turn, when a polyurethane foam is applied to at least one side (e.g., the back side) of the stitched soft skins, the film over the stitched holes of the stitched soft skin minimizes or prevents polyurethane "bleeding out" or polyurethane "leakage" coming from the polyurethane foam attached to the stitched skins. Advantageously, the problems and difficulties of the prior art related to "bleeding out" or "leakage" of polyurethane from the polyurethane foam attached to the stitched skins can be solved by the present invention.

The above embodiments of the present invention can be particularly useful in automotive applications.

DETAILED DESCRIPTION

One broad embodiment of the present invention includes a sealed stitched skin structure which includes (i) a stitched skin member and (ii) a seam comprising a film or coating of a dispersion sealant coating composition described herein below. The coating is disposed on, and adhered to, at least a portion of at least one of the surfaces of the stitched skin member (e.g., the back side of the skin member); and disposed on, and adhered to, the stitched holes present in the stitched skin member; wherein the coating is adhered to the stitching of the skin member which, in turn, forms a sealed stitched skin structure. A "seam", with reference to a skin member, herein means the line formed by sewing and/or the stitches used to make such a line.

The stitched skin member useful in the present invention may be made of any material that the dispersion sealant coating composition can adhere thereto. Generally, the skin member material can include various synthetic skin materials that can be made of materials including, for example, polyvinyl chloride (PVC); thermoplastic urethane (TPU); and thermoplastic elastomer (TPE); and the like; and mixtures thereof.

The skin member can be made of any thickness desired for the particular application that the stitched skin structure will be used in. For example, the thickness of the skin member can be from 0.3 millimeters (mm) to 5 mm in one embodiment, from 0.5 mm to 2 mm in another embodiment, and from 0.8 mm to 1.3 mm in still another embodiment.

The skin member materials can be made by any conventional skin forming equipment and method such as by slush molding, injection molding, sheet extrusion, thermoforming and calendering.

The stitches of the skin member can be formed by any conventional stitching means and the stitching can be made into a variety of stitch patterns. Typically, the stitches are formed in a line across the surface of the skin member.

The second component (ii) of the sealed stitched skin structure can be a film or coating on the surface of the seam stitches of the skin member. The coatings can be produced from an aqueous polyolefin dispersion sealant coating composition described herein below. The aqueous dispersion sealant coating composition can be applied to the seam/stitches of the skin member where the stitched holes of the stitches are located; and then the coating composition can be dried. The dried composition forms a film or coating covering the seam/stitches. The film on the seam then seals the stitched holes in the stitched skin member located where PU leakage can occur.

The film or coating can be of a sufficient size (i.e., length, width and thickness) to seal the seam/stitch line (i.e., to form a barrier) to prevent polyurethane leakage from the polyurethane foam attached to the stitched skin structure. In general, the film size can be any desired size and can depend on the particular application that the stitched skin structure will be used in. For example, when used in an automotive part, as an illustration and not to be limited thereby, the length of the film can be from 1 meter to 2 meters; the width of the film can be from 15 mm to 30 mm; and the thickness of the film can be from 0.05 mm to 1 mm. The dimensions of the film can be varied in various regions to tailor the sealability of the film in the particular region.

In one broad embodiment, the aqueous thermoplastic polyolefin dispersion sealant coating composition used to make the film or coating disposed on the sealed stitched skin structure can include (a) a first polymer phase component containing (ai) at least one polyolefin elastomer and (aii) at least one polymeric surfactant; (b) a second aqueous phase comprising water as the medium, and (c) a neutralizing phase containing at least one neutralizing agent; wherein the water medium is the continuous phase and the other solid components in the composition is the dispersed phase. Other optional compounds or additives or agents can be added to the dispersion as desired as optional component (d).

Once the aqueous thermoplastic polyolefin dispersion sealant coating composition is applied to a skin member and dried, a film or coating is formed on the surface of the skin member for sealing stitch holes present in stitched skin which ultimately minimize or prevent polyurethane leakage from polyurethane foam that may be attached to the stitched skins.

The polymer used in the polymer phase component of the aqueous polyolefin dispersion sealant coating composition of the present invention may include for example an elastomer such as ethylene alpha-olefin random polymer (e.g., ENGAGE available from The Dow Chemical Company [Dow]); an ethylene alpha-olefin block copolymer (e.g., INFUSE available from Dow); an ethylene propylene copolymer (e.g., VERSIFY and INTUNE both available from Dow); ethylene propylene diene copolymer (EPDM), ethylene vinyl acetate (EVA), ethylene vinyl alcohol (EVOH) and mixtures thereof.

In one embodiment, the elastomer is preferably flexible at a temperature range of from −40° C. to 125° C.; from −30° C. to 120° C. in another embodiment; and from −30° C. to 110° C. in still another embodiment.

In one embodiment, the polymer phase can include, in addition to the first elastomer described above, more than one type of elastomer, such as a second different elastomer to tailor the softness and/or flexibility of the skin. Such elastomers may include, for example, the same elastomers listed above. In another embodiment, the second different elastomer can also include polar materials such as maleic anhydride (MAH) grafted ENGAGE, INTUNE and VERSIFY; ethylene acrylic acid copolymers; and methacrylic acid copolymers (e.g., NUCREL, PRIMACOR), ethylene acrylate (e.g., methyl acrylate, ethyl acrylate, butyl acrylate, glycidyl methacrylate) (ELVALOY); ethylene vinyl alcohol (EVOH) ionomers of sodium and zinc neutralized acrylic copolymers (SURYLN); and mixtures thereof. In still another embodiment, the second different elastomer can also include harder materials such as low density polyethylene (LDPE), linear low density polyethylene (LLDPE), high density polyethylene (HDPE), and mixtures thereof.

Generally, the amount of the elastomer, component (ai), used in the formulation of the present invention can be generally for example from 50 weight percent (wt %) to 99 wt % in one embodiment, from 55 wt % to 90 wt % in another embodiment; and from 60 wt % to 80 wt % in still another embodiment; based on the total weight of all components in the foam formulation.

The polymeric surfactant useful in the polymer composition may include for example, an ethylene acrylic acid (EAA) copolymer (e.g., PRIMACOR available from SK Chemicalor and NUCREL available from Dupont); and mixtures thereof.

Also, the polymeric phase can include, in addition to the first surfactant described above, more than one type of surfactant (PRIMACOR) such as a second surfactant to alter the film forming process and/or the adhesion of the polymer to PU foam. Such surfactants may include, for example, low MW aliphatic (C15-C50) carboxylic acid (e.g., UNICID available from Baker Hughes) MAH grafted polyolefins (e.g., AMPLIFY available from Dow and FUSABOND available from Dupont) and mixtures thereof.

Generally, the amount of the surfactant, component (aii) used in the formulation of the present invention can be generally for example greater than 1 wt % for adhesion to the PU foam in one embodiment; from 1 wt % to 50 wt % in another embodiment; from 20 wt % to 40 wt % in still another embodiment; and from 25 wt % to 35 wt % in yet another embodiment; based on the total weight of all components in the foam formulation.

In another embodiment, optional compounds or additives can be added to the polymer phase component (a) such as fillers, additives, stabilizers, pigments can be added to the polymeric phase to meet enduse application requirements; or as desired without deleteriously affecting the performance of the polymeric phase.

Generally, the amount of the optional additives, component (aiii) used in the formulation of the present invention can be generally for example from 0.1 wt % to 20 wt % in one embodiment; from 0.3 wt % to 10 wt % in another embodiment; and from 0.5 wt % to 5 wt % in still another embodiment; based on the total weight of all components in the foam formulation.

The medium used in the aqueous phase component of the aqueous polyolefin dispersion sealant coating composition of the present invention is water.

In general, concentration of the water, component (b) used in the present invention may range generally from 30 wt % to 70 wt % in one embodiment, from 40 wt % to 65 wt % in another embodiment, and from 50 wt % to 60 wt % in still another embodiment, based on the total weight of all components in the foam formulation.

In another embodiment, optional compounds or additives can be added to the aqueous phase as component (bii) such as fillers, additives, stabilizers, pigments and mixtures thereof. The optional compounds can be added to the aqueous phase to meet enduse application requirements; or as desired without deleteriously affecting the performance of the aqueous phase.

Generally, the amount of the optional additives, component (bii) used in the formulation of the present invention can be generally for example from 0.1 wt % to 50 wt % in one embodiment; from 0.5 wt % to 20 wt % in another embodiment; and from 1 wt % to 10 wt % in still another embodiment; based on the total weight of all components in the foam formulation.

The aqueous polyolefin dispersion sealant coating composition of the present invention can include a neutralizing agent such as a base. For example, the neutralizing agent may include KOH, NaOH, DMEA, ammonia, and the like; and mixtures thereof.

A minimum/optimum level of neutralization useful in the present invention should be used to create a stable dispersion (e.g., >50 wt %). For example, the degree of neutralization useful in the present invention can be from 50 wt % to 150 wt % in one embodiment; from 70 wt % to 130 wt % in another embodiment; and from 80 wt % to 110 wt % in still another embodiment. "Stable" or "stabilized" or "stabilization", with reference to a dispersion, herein means the dispersed polymer particles do not settle with time over a long period of time (e.g., at least 6 months) and/or can be readily re-dispersed with mechanical agitation.

In another embodiment, optional compounds or additives can be added to the aqueous phase as component (cii) such as fillers, additives, stabilizers, pigments, anti-rust agent, anti-mold agent, UV absorber, thermal stabilizer, and mixtures thereof. The optional compounds can be added to the aqueous phase to meet enduse application requirements; or as desired without deleteriously affecting the performance of the aqueous phase.

Generally, the amount of the optional additives, component (cii) used in the formulation of the present invention can be generally for example from 0.1 wt % to 5 wt % in one embodiment; from 0.2 wt % to 1 wt % in another embodiment; and from 0.2 wt % to 0.5 wt % in still another embodiment; based on the total weight of all components in the foam formulation.

A variety of optional compounds can be added to the aqueous dispersion formulation. For example, other aqueous systems such as acrylic emulsions and polyurethane dispersions can be added to the aqueous dispersion formulation. Other additives include, for example, a thickening agent can be added to the aqueous dispersion to increase the viscosity of the system.

For example, in one embodiment, optional compounds and additives such as pigments, stabilizers, fillers can be added to the sealant composition by adding the optional compounds to the polymer phase, the aqueous phase and/or the neutralizing phase to meet enduse application requirements; or as desired without deleteriously affecting the performance of the sealant composition. Other optional additives useful in the sealant composition can include, for example, microbial agents and the like. In still another embodiment, optional thickeners can be added to the sealant composition to control the viscosity of the dispersion for the purpose of providing a dispersible dispersion that can be applied as a dispersion to a skin material Organic thickeners that may be used in the dispersion formulation include polyvinyl alcohol, polyvinyl pyrrolidone, polyvinyl methylether, polyethylene oxide, polyacrylamide, polyacrylic acid, carboxy methyl cellulose, methyl cellulose, hydroxyethyl cellulose, and mixtures thereof; and inorganic thickeners that may be used in the dispersion formulation include silicon dioxide, active clay, bentonite, and mixtures thereof. The optional thickeners may be used for improving the stability and adjusting the viscosity of the dispersion. Dispersing agents such as nonionic dispersing agents and anionic dispersing agents and water-soluble polyvalent metal salts can also be used for improving the stability of the dispersion.

The amount of optional compounds or additives, when used in the composition, can be generally in the range of from 0 wt % to 5 wt % in one embodiment; from 0 wt % to 2 wt % in another embodiment; and from 0 wt % to 1 wt % in still another embodiment.

In one general embodiment, the viscosity of the dispersion can be, for example, from 100 megapascals-seconds (mPa-s) to 500,000 mPa-s, from 200 mPa-s to 100,000 mPa-s in another embodiment, and from 300 mPa-s to 10,000 mPa-s in still another embodiment.

In another embodiment, other functional polyolefins useful as surfactants for the dispersion may include for example, —MAH, —OH or —$NH_2$ functional groups. In still another embodiment, chlorinated polyethylenes can be added to the dispersion for increasing the bonding strength of the dispersion to another material such as PVC. And in yet another embodiment, the present invention may include a hybrid dispersion, i.e., a dispersion containing multiple compounds. The hybrid dispersion may include, for example, acrylic compounds, silicone compounds, PU compounds, and mixtures thereof.

The solids content of the dispersion can be for example, from 30 wt % to 80 wt % in one embodiment and from 40 wt % to 50 wt % in another embodiment.

In one broad embodiment, the process for producing an aqueous thermoplastic polyolefin dispersion sealant coating composition used for sealing stitch holes present in stitched skins to prevent polyurethane leakage from polyurethane foamed stitched skins includes admixing: (a) a first polymer phase component containing (ai) at least one elastomer and (aii) at least one polymeric surfactant; (b) a second aqueous phase comprising water as the medium, and (c) at neutralizing phase containing at least one neutralizing agent; wherein the water medium is the continuous phase and the other solid components in the composition is the dispersed phase. Optionally, the dispersion composition of the present invention can include adding any other desired optional additives, component (d), into the mixture of components (a), (b) and (c) described above.

In the present invention, a polyolefin resin can be dispersed using an extruder based mechanical dispersion process such as the method described in U.S. Pat. Nos. 7,803,865 and 7,763,676 (see the Examples herein below). The extruder based mechanical dispersion process imparts high shear on a polymer melt/water mixture to facilitate a water continuous system with small polymer particles in the presence of surface active agents that reduce the surface tension between the polymer melt and water. A high solids content water continuous dispersion is formed in the emulsification zone of the extruder also known as high internal phase emulsion (HIPE) zone, which is then gradually diluted to the desired solids concentration, as the HIPE progresses from the emulsification zone to the first and second dilution zones.

The polyolefin polymer is fed into the feed throat of the extruder by means of a loss-in weight feeder. The dispersion agent is added with the polyolefin polymer. The extruder and its elements are made of nitrided carbon steel. The extruder screw elements are chosen to perform different unit operations as the ingredients pass down the length of the screw. There is first a mixing and conveying zone, next an emulsification zone, and finally a dilution and cooling zone. Steam pressure at the feed end of the extruder is contained by placing kneading blocks and blister elements between the melt mixing zone and is contained and controlled by using a back-pressure regulator. ISCO dual-syringe pumps metered the "initial water", "base", and "dilution" flows to each of the flows' respective injection ports. The polyolefin, dispersing agent, and water are melt kneaded in the twin screw extruder at screw revolutions per minute (RPM) of 1150; and neutralized with potassium hydroxide (KOH). The mean particle size of the dispersed polymer phase is measured by a Coulter LS230 particle analyzer; and the particle size consisted of an average volume diameter in microns (e.g., see Table II herein below). Viscosity is determined according to Brookfield Viscometer. Solids are determined by a moisture analyzer. Filterable residue is determined by filtration through a 70 mesh (200 μm) filter. Too much residue in a dispersion can have a negative impact on the ability to spray the dispersion via, for example, a nozzle gun.

The present invention includes the use of aqueous dispersion where the solidification method involves film formation which is an improvement over other processes requiring the use of a crosslinking agent. The use of a dispersion simplifies the handling and application of the dispersion; and provides a more cost-effective route to sealing the stitches of a skin material. In one preferred embodiment, the elastomer used in the dispersion has to be appropriately selected to provide a dispersion that is thermally stable at a temperature of at least 120° C.

Also, the dispersion of the present invention can be expected to exhibit good adhesion to PU foam as well as skin materials such as polyvinyl chloride (PVC), thermoplastic urethane (TPU) and thermoplastic elastomer (TPE). The present invention includes applying stitched skins with the dispersion, drying the dispersion to make a coated stitched skin structure and that provides seam sealing. Experimental plaque samples tested have shown good sealing with the dispersion of the present invention; and foamed samples of skin materials have passed heat aging (at 120° C., 1,000 hours) testing. Using the dispersion with skin materials such as PVC, TPU, and TPE provides a sealed stitched skin structure with good adhesion to skin and good sealing of the stitched areas of the skin.

In addition to the above advantageous properties and benefits of the dispersion of the present invention, in other embodiments, the advantages using the dispersion of the present invention as a sealant composition can include for example:

(1) The process flexibility of being able to apply the dispersion via several ways such as spraying, painting, casting or extruding. All of these application processes can be automated which may reduce inherent labor and cost of the process.

(2) The dispersion can be easy to apply in complex contours and tight radii.

(3) Applying the dispersion sealing solution compared to using a seam tape is a simplified process.

(4) An improved sealing capability using the dispersion which can lead to a reduction in the amount of scrap produced in the process, particularly reducing the scrap rate for instrument panels (IP). Reducing scrap rate is a significant benefit to a process because typically the entire IP (which consists of, e.g., a substrate plus PU foam plus skin; and costs a significant amount) has to be scrapped when a defect in the sealing part of the IP is found.

(5) Still another advantage of the dispersion of the present invention is that the dispersion has a low viscosity (~300 mPa-s) and the viscosity of the dispersion can be tailored (e.g., with thickeners) to allow the dispersion to penetrate the seals for better wet-out but not bleed through the stitches to show up on a Class A surface. In one general embodiment, the viscosity of the emulsion can be, for example, from 100 mPa-s to 10,000 mPa-s, from 150 mPa-s to 2,000 mPa-s in another embodiment, and from 200 mPa-s to 1,000 mPa-s in still another embodiment.

The present invention is advantaged over the prior art processes of sealing stitched holes because the dispersion includes a thermoplastic polyolefin material used as the sealant and the sealant is aqueous based. The present invention also includes a solidification method that involves a film formation step in the process. In the present invention process there is no crosslinking or curing involved. The thermoplastic material is a film-forming material that forms a skin (film) that provides sealing as compared to a thermoset material that sets via curing. The present invention has the advantages of simplifying the handling and application of the sealing materials; and providing a more cost-effective method of sealing stitched seam holes from PU foam leakage.

The dispersion of the present invention may have other advantageous properties and benefits such as low gloss; UV and thermal stability; and good scratch and mar performance.

Other embodiments which will become apparent to one skilled in the art and within the scope of the present invention can include changing the dispersion make up to provide a desired property or other benefit of the dispersion.

In a broad embodiment of the present invention, a process for producing a sealed stitched skin structure includes the steps of:

(a) providing a stitched skin member;
(b) providing an aqueous thermoplastic polyolefin dispersion sealant coating composition;
(c) applying the aqueous thermoplastic polyolefin dispersion sealant coating composition from step (b) to at least a portion of the surface of at least one side of the skin member to form a wet film or coating of the thermoplastic polyolefin dispersion sealant coating composition on the surface of the skin member;
(d) drying the wet coating of sealant composition from step (c) on the skin member surface at a temperature of from 50° C. to 100° C. and at process conditions to form a dried skin member having a dried film coating of sealant composition on at least a portion of the surface of a skin member and on the stitched holes present in the skin member; and
(e) heating the dried skin member having the dried coating of sealant composition from step (d) at a temperature and at process conditions sufficient to form a film or coating of the aqueous thermoplastic polyolefin dispersion sealant coating composition on the seam of stitches/stitch holes present in the skin member and on at least a portion of the surface of a skin member; wherein the film or coating seals the seam of stitches in the skin member.

This admixing step has been described above. As aforementioned, the aqueous thermoplastic polyolefin dispersion sealant coating composition can be produced by admixing: (a) a first polymeric phase component; (b) a second aqueous phase component comprising water as a medium; and (c) the neutralizing phase; wherein the water medium comprises a continuous phase; and wherein the polymer resin comprises a dispersed phase; and wherein the admixing is carried out at process conditions to form an aqueous dispersion sealant coating composition.

The aqueous dispersion sealant coating composition can be applied to at least a portion of the surface of at least one side of a skin member and to the stitch holes present in the skin member to form a wet film or coating of the aqueous dispersion sealant coating composition on the surface of the skin member.

The application process for applying the dispersion coating of the present invention to a skin member may include, for example, any one or more conventional methods known in the coating art. For example, the aqueous dispersion coating composition may be applied to the synthetic skin member using conventional coatings application methods such as a curtain coater method, spraying, casting, extruding, and painting—foam or roll brush and the like. In one preferred embodiment, a conventional coating application method used in the present invention can be, for example, a spraying method such as, air-atomized spray, air-assisted spray, airless spray, high-volume low-pressure spray, and air-assisted airless spray. In a preferred embodiment, the dispersion can be applied along a narrow (e.g., 5 centimeters [cm]) width of the stitch line of the skin. The aqueous dispersion coating composition may be applied to a synthetic skin member such as, PVC, TPU, TPE, and the like.

The drying process for drying a dispersion of the present invention on a skin may include, for example, any one or more of the following methods: oven heating the skin and the coated skin; using IR heaters; heating the dispersion prior to applying the dispersion on a skin; and the like.

In one general embodiment, the temperature of drying the emulsion can be, for example, from 50° C. to 100° C., from 55° C. to 95° C. in another embodiment, and from 60° C. to 90° C. in still another embodiment.

The sealed stitched skin structure produced in accordance with the present invention advantageously has advantageous properties and benefits. There should be no visual defects after application of the dispersion skin. The coated stitch area of the skin should have similar haptics as the rest of the skin. The appearance should not change after exposure to cold or hot temperature conditions.

The polyurethane foamed article of the present invention includes (A) a sealed stitched skin structure having a seam of stitched holes as described above; and (B) a polyurethane foam applied to the seam of the film or coating and at least a portion of the surface of the skin member where the seam of the film or coating is located.

The film coating seam in the sealed stitched skin structure is sufficient to seal the stitch holes present in the stitched skin member to prevent polyurethane leakage from the polyurethane foam adhered to at least a portion of one surface of the sealed stitched skin structure.

In one broad embodiment, the process for producing a polyurethane foamed article of the present invention can include the steps of: (I) providing a sealed stitched skin structure as described above; (II) forming a polyurethane foam; and (III) applying the polyurethane foam to the sealed stitched skin structure. The film or coating of the sealed skin structure advantageously prevents polyurethane leakage from the polyurethane foam adhered to the sealed stitched skin structure.

The process for producing a polyurethane foamed article can be carried out under conventional polyurethane foam-producing processes and conditions that are known to those skilled in the art. For example, in one embodiment, the process of producing a polyurethane foamed article can include an injection molding process where after preparing a PU foam-forming system or composition and mixing the composition, the composition is injected directly into a closed mold. The mold is typically held at a temperature of, for example, from 40° C. to 70° C. The polyol and isocyanate components of the PU foam-forming composition are typically held at a constant temperature of, for example, 25° C. to 50° C. The two components making up the PU foam-forming composition can be mixed with impingement mixing prior to being injected into the mold.

In another embodiment, an open pour method can be used to produce a polyurethane foamed article where after preparing a PU foam-forming system or composition and mixing the composition, the composition is poured directly into a mold cavity and a lid for the mold cavity is secured over the mold cavity. Both the injection molding process and the open pour method described above are carried out in a closed mold. However, an open pour method of pouring the composition into an open mold cavity can also be used. For example, step (II) of forming a polyurethane foam; and step (III) of applying the polyurethane foam to the sealed stitched skin structure described in the processes above, may be carried out by injecting or pouring in an open or closed mold containing the sealed stitched skin; and optionally a hard carrier substrate. When a hard carrier substrate is used, the PU foam can be injected in between the sealed stitched skin and the hard carrier substrate.

In still another preferred embodiment, the process for producing the polyurethane foamed article of the present invention can include the steps of:

(1) providing a stitched skin member having stitched holes;
(2) providing a sealant coating composition;
(3) providing a film coating seam derived from the sealant coating composition;
(4) sealing the stitched holes present in the stitched skin member with the film coating seam derived from the sealant coating composition; and
(5) applying a polyurethane foam to the sealed skin.

The sealing step (4) described above can be carried out by the steps of: (a) applying the sealant coating composition to at least a portion of the surface of the stitched skin member and to the stitch holes present in the stitched skin member to form a wet coating of sealant coating composition on the stitched skin member surface; (β) drying the stitched skin member having the wet coating of sealant composition from step (α) at process conditions to form a dried skin member having a dried film coating of sealant composition on at least a portion of the surface of the stitched skin member and on the stitch holes present in the stitched skin member; and (γ) heating the dried stitched skin member having a dried film coating of sealant composition from step (β) at process conditions to form a film coating seam of sealant composition on at least a portion of the surface of the stitched skin member and on the stitch holes present in the stitched skin member sufficient to seal the stitch holes present in the stitched skin member to form a sealed stitched polyurethane foamed article.

The foam-foaming for making the polyurethane foam may include any of the conventional polyurethane systems or composition and procedures known in the art. Generally, a foam-forming composition including, a reactive mixture of a polyol component and a polyisocyanate component are mixed together and the reaction mixture is either (i) injection molded in a closed mold as described above or (ii) open poured in an open mold and then the open mold is closed as described above.

The sealed stitched skin structure having a foam backing produced in accordance with the present invention advantageously has no foam leakage in the stitched area and that has no visual defects.

The final foamed article or product including the sealed stitched skin structure having a foam backing as described above and made in accordance with the present invention can be useful in a variety of applications. For example, the foamed article can be used in automotive applications, in particular, for stitched skins used in automotive interior applications like instrument panels (IPs), door panels (DP), armrest, consoles, trim and seating; and for applications where superior haptics (soft touch) is desired.

EXAMPLES

The following examples are presented to further illustrate the present invention in detail but are not to be construed as limiting the scope of the claims. Unless otherwise stated all parts and percentages are by weight.

Various raw materials used in the Examples are described in Table I as follows:

TABLE I

| Raw Materials | | |
|---|---|---|
| Component | Brief Description | Supplier |
| ENGAGE 8200 ® | Ethylene octane random copolymer, 0.87 density, 5 melt flow rate (MFR), melting point (Tm) = ~59° C., 72 Shore A hardness. | The Dow Chemical Company |
| PRIMACOR 5980i ® | 20% acrylic acid, 0.958 density, 300 MFR (190° C./2.16 Kg), Tm = ~78° C. | The Dow Chemical Company |
| INFUSE 9530 ® | Ethylene octene block copolymer (10.4% octene), 0.887 density, 5 MFR, Tm = ~123° C., heat of fusion = 70 J/g, 83 Shore A hardness. | The Dow Chemical Company |
| TPE (thermoplastic elastomer) | A mixture of INFUSE 9530 plus 5% black masterbatch | The Dow Chemical Company |
| Nakan DSY300/15 | PVC slush grade | Nakan |
| Sanyo TU-318H | TPU (thermoplastic urethane) slush grade | Sanyo |

Examples 1 and 2

The dispersions used in Examples 1 and 2 are described in Table II; and the dispersions were made using the following components:

(1) HYPOD 8503 Aqueous Dispersion is an aqueous dispersion that contains 60% ENGAGE 8200 and 40% PRIMACOR 5980i, based on the polymer phase; and has a 42% solids content.

(2) PW-2 Dispersion is a dispersion that contains 60% INFUSE 9530 and 40% PRIMACOR 5980i on polymer phase; and has a 42% solids content.

TABLE II

Dispersion

|  | Units | Example 1 HYPOD 8503 | Example 2 PW-2 |
|---|---|---|---|
| Component |  |  |  |
| Polymer | % | 60 | 60 |
| Surfactant | % | 40 | 40 |
| Base used |  | KOH | KOH |
| Degree of Neutralization | % | 84.9 | 84.9 |
| Target Solids | wt % | 42 | 42 |
| Product Characteristics |  |  |  |
| Mean Particle Size | Micron | 1.34 | 1.367 |
| pH |  | 10.07 | 10.09 |
| Viscosity (20 rpm) | mPa-s | 228 | 314 |
| Solids | wt % | 40.57 | 40.24 |
| Filterable residue | ppm | 26 | 19 |

General Procedure for Coating Stitched Skins

PVC, TPU and TPE grained skins (250 cm×390 cm) that are previously made on a lab scale slush molding machine are used. A seam stitching periodically spaced pattern is added to the skins using a stitching machine.

General Procedure for Coating Stitched Skins

The skins are pre-heated in a conventional oven set at 90° C. The heated skins are then coated in the stitched areas of skins with the HYPOD 8503 or PW-2 dispersion either by spraying with a spray gun or painting with a foam brush. The coated or sprayed skins are placed back in the oven to dry out the dispersion and make a skin. From 0-3 layers of spray or panted coatings are applied. The skins in the seam area can be clearly identified by visual inspection. In general, a skin of one material such as a PVC skin is provided with three of the following seams: one seam is not coated (blank, labeled "A"); the next seam is sprayed (labeled "B"); and the next seam is painted with a foam brush (labeled "C"). The skins are labeled accordingly. In general, the painted dispersion shows a better wet-out and adhesion to a PVC skin compared to the sprayed dispersion. For a TPU and TPE skin, the application method does not appear to make a difference.

General Procedure for PU Foaming and Heat Aging Foamed Samples

A foaming process is carried out in a 2× mold (500 cm×500 cm×1.2 cm) using a high pressure Graco machine. The coated skins described above are placed in in the mold with the grained surface of the skin on the bottom of the mold and the coated stitch side of the skin facing the top of the mold. A liquid mixture of an isocyanate and a polyol is then poured on the top surface of the skin and the mold is closed to continue and complete the foaming process.

In the Examples, the PU foam used included the following: An instrument panel foam system (XUR56 polyol/PAPI 94 Isocyanate) was used to back foam the skins. PAPI 94 Isocyanate, XUR56 Polyol (composition described below in Table III), 105 Index, 7 pounds per cubic foot (pcf) density foam.

TABLE III

Polyol Component of PU Foam System

| Component Description | Component | % |
|---|---|---|
| Polyols | VORANOL* CP 6001 Polyol | 57.10 |
|  | VORANOL* 220-110N Polyol | 5.00 |
|  | VORANOL* 4053 Polyol | 2.00 |
|  | SPECFLEX* 3943A Polyol | 5.00 |
|  | SPECFLEX NC 630 Polyol | 21.20 |
| Crosslinkers | DEOA (85%) | 0.30 |
|  | TEOA (99%) | 0.70 |
| Catalysts | Jeffcat ZF-10 | 0.20 |
|  | [2-((2-(2-(Dimethylamino)ethoxy)ethyl) methylamino)ethanol Catalyst] |  |
|  | Polycat 15 | 1.10 |
|  | Bis(N,N-dimethyl-3-amino-propyl)amine |  |
| Adhesion Promoter | Diexter G 156T-63 | 4.00 |
|  | [Hydroxyl terminated Saturated Polyester OH 63-65] |  |
| Colorant | Repitian 99375 | 0.30 |
| Blowing Agent | Water | 3.10 |
|  | Total Polyol Components | 100.00 |

Figure 3:
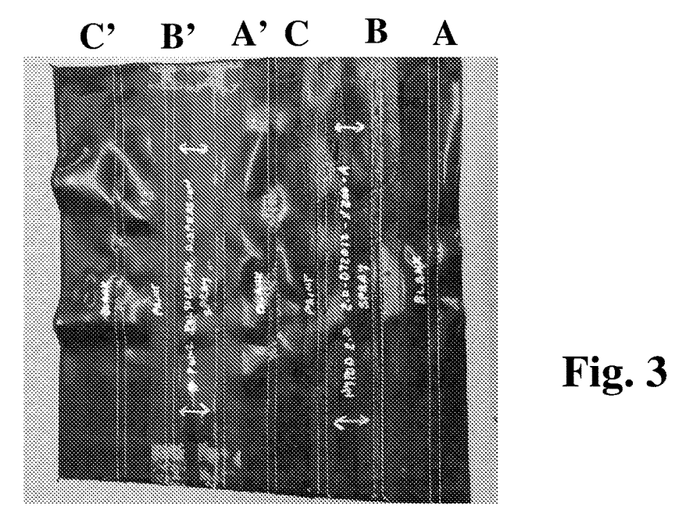
FIG. 3 is a photograph showing a stitched PVC skin coated with Hypod 8503 dispersion (A, B, and C) and coated PW-2 dispersion (A', B', and C'). The three different areas of stitching and stitching coated with Hypod 8503 dispersion are: (A) blank (no coating), (B) coating having 1 spray coat, and (C) coating having 1 paint coat. The three different areas of stitching and stitching coated with PW-2 dispersion are: (A') blank (no coating), (B') coating having 1 spray coat, and (C') coating having 1 paint coat.

In FIG. 3, there is shown a PVC skin with 6 stitching seams areas having been coated with Hypod 8503 dispersion (A, B, and C) and coated PW-2 dispersion (A', B', and C'). As seen in FIG. 3 with PVC skin, one seam was not coated (blank, labeled "A" and "A'"); the next seam shown in FIG. 3 was sprayed (labeled "B" and "B'"); and the next seam shown in FIG. 3 was painted with a foam brush (labeled "C" and "C'").

Figure 4:
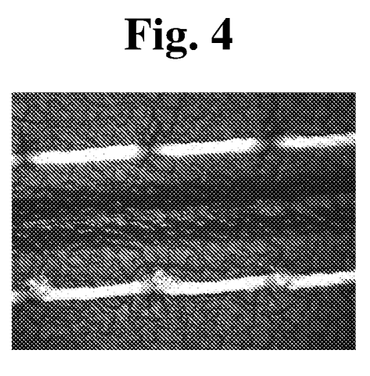
FIG. 4 is a photograph showing a PU-foamed PVC skin having no coating and showing PU leakage through the stitch holes of the skins.
Figure 5:
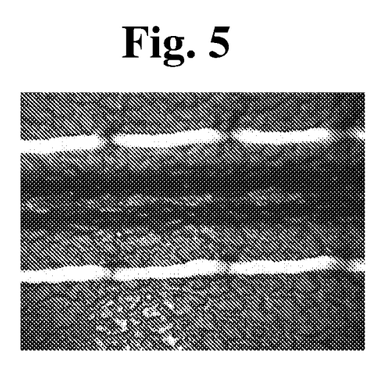
FIG. 5 is a photograph showing a PU-foamed PVC skin coated with a coating of 2 paint coats and showing no PU foam leakage.

In FIG. 4, there is shown a PU-foamed PVC skin having no coating and showing PU leakage through the stitch holes of the skin. For the PVC skin of FIG. 4, as expected there was significant foam leakage at the stitch holes for the blank (no coating). In FIG. 5, there is shown a PU-foamed PVC skin coated with a coating of 2 paint coats and showing no PU foam leakage.

Figure 6:
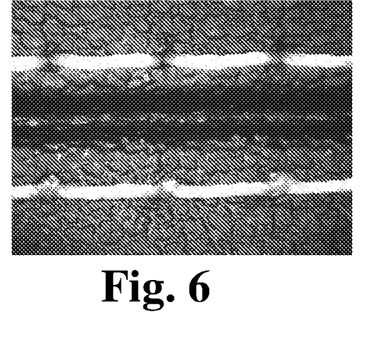
FIG. 6 is a photograph showing a PU-foamed PVC skin coated with a coating of 2 spray coats and showing PU foam leakage.
Figure 7:
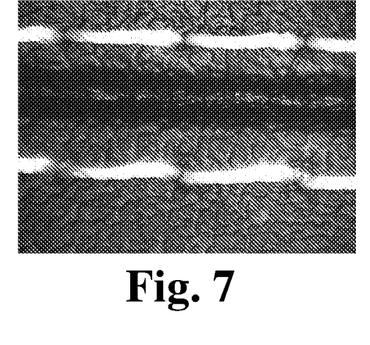
FIG. 7 is a photograph showing a PU-foamed PVC skin coated with a coating of 3 spray coats and showing no PU foam leakage.

The PU-foamed PVC skin of FIG. 6 coated with a coating of 2 spray coats shows some PU foam leakage; while the PU-foamed PVC skin coated with a coating of 3 spray coats, shown in FIG. 7, showed no PU foam leakage. For the spray method shown in FIGS. 6 and 7, the results indicate that it helps to have have multiple coats for improved sealing. From FIGS. 5 and 6, the results indicate that, in general, the sprayed dispersion sample can have some leakage (see FIG. 6) while the painted sample showed has good sealing effect (see FIG. 5). In general, the type of dispersion did not make a difference with both painted HYPOD 8503 and PW-2 coated seams, as both showed excellent PU foam sealing.

Figure 8:
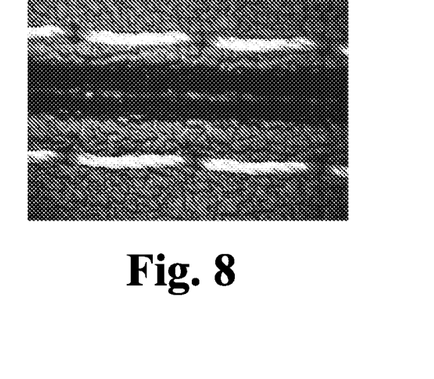
FIG. 8 is a photograph showing good seam sealing of a stitched TPU skin having a coating of 2 paint coats.
Figure 9:
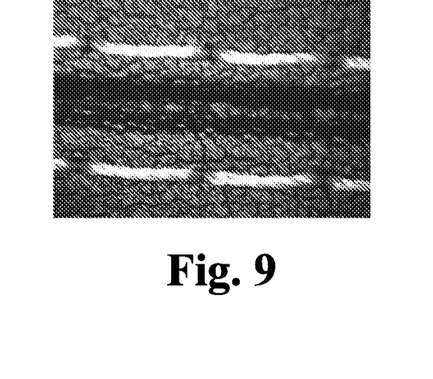
FIG. 9 is a photograph showing good seam sealing of a stitched TPU skin having a coating of 2 spray coats.

For the stitched TPU foamed skins of FIGS. 8 and 9, both the painted on coating of the TPU skin having a coating of 2 paint coats of dispersion (see FIG. 8), and the sprayed on coating of the TPU skin having a coating of 2 spray coats of dispersion (see FIG. 9), sealed the stitch holes well while there was leakage for the blank (no coating). FIGS. 8 and 9 showing magnified views of the stitch holes show excellent sealing.

Figure 10:
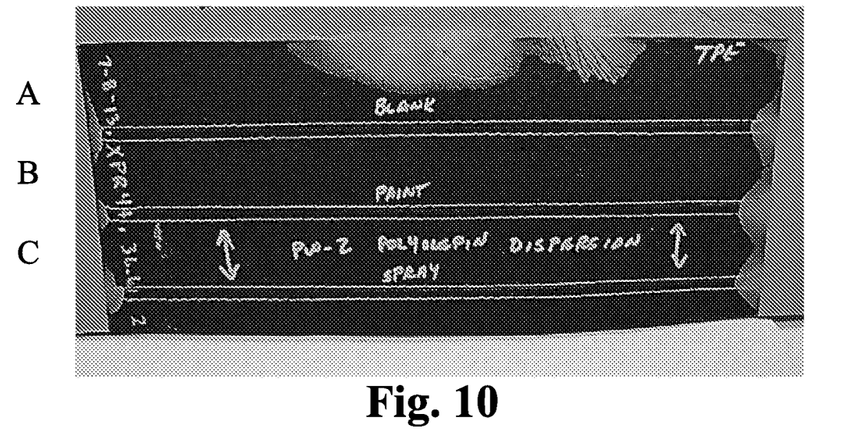
FIG. 10 is a photograph showing a stitched PU-foamed TPE skin; and which contains three different areas of stitching and coatings on the stitching: (A) blank (no coating), (B) coated with the coating having 1 paint coat, and (C) coated with the coating having 1 spray coat.
Figure 11:
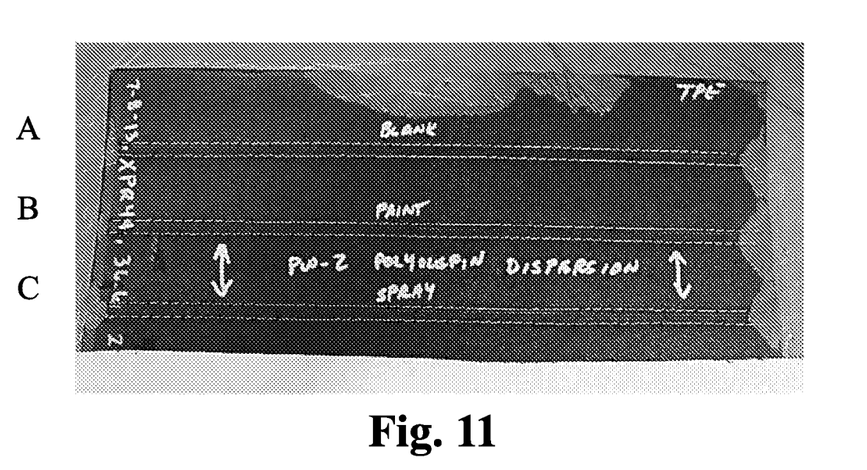
FIG. 11 is a photograph showing a stitched PU-foamed TPE skin from FIG. 10; which has been heat aged at 120° C. and 1,000 hours; and which contains three different areas of stitching and coatings on the stitching: (A) blank (no coating), (B) coated with the coating having 1 paint coat, and (C) coated with the coating having 1 spray coat.

In FIG. 10, there is shown a stitched PU-foamed TPE skin having three different areas of stitching and coatings on the stitching: (A) blank (no coating), (B) coated with the coating having 1 paint coat, and (C) coated with the coating having 1 spray coat. FIG. 10 shows the stitched PU-foamed TPE skin prior to heat aging the skin at 120° C. and 1,000 hrs. In FIG. 11, there is shown the stitched PU-foamed TPE skin from FIG. 10; which has been heat aged at 120° C. and 1,000 hours; and which contains three different areas of stitching and coatings on the stitching: (A) blank (no coating), (B)

coated with the coating having 1 paint coat, and (C) coated with the coating having 1 spray coat. After heat aging for 120° C. and 1,000 hours (hr) there was no PU foam leakage or aesthetic change in the stitch holes (see FIG. 11 and compare to FIG. 10). Hence, it appears that once the foam process is complete and the seam sealed, the thermal stability of the seal is good. HYPOD 8503 melts at 120° C. while PW-2 does not melt at 120° C. Therefore, the results confirm that there was no change in good sealing or good aesthetics in the seam area after heat aging the TPE skin at 120° C. and 1,000 hrs (FIGS. 10 and 11).

What is claimed is:

1. A sealed stitched skin structure comprising (i) a stitched skin member; and (ii) a film or coating made from an aqueous thermoplastic polyolefin dispersion sealant coating composition adhered to at least one side of the stitched skin member, the film or coating comprising:
   (i) a first polymer phase component containing
      (αi) at least one elastomer selected from ethylene alpha-olefin random polymer, ethylene alpha-olefin block copolymer, ethylene propylene copolymer, ethylene propylene diene copolymer, ethylene vinyl acetate, ethylene vinyl alcohol and mixtures thereof, wherein the amount of the at least one elastomer is from 60 wt % to 80 wt %; and
      (αii) at least one polymeric surfactant from 20 wt % to 40 wt %;
   (ii) a second aqueous phase comprising water as the medium, and
   (iii) a neutralizing phase containing at least one neutralizing agent; wherein the water medium is the continuous phase and the other solid components in the composition is the dispersed phase; and wherein the admixture forms an aqueous thermoplastic polyolefin dispersion sealant coating composition.

2. A process for producing a sealed stitched skin structure comprising the steps of:
   (a) providing a stitched skin member;
   (b) providing an aqueous thermoplastic polyolefin dispersion sealant coating composition comprising:
      (i) a first polymer phase component containing
         (αi) at least one elastomer selected from ethylene alpha-olefin random polymer, ethylene alpha-olefin block copolymer, ethylene propylene copolymer, ethylene propylene diene copolymer, ethylene vinyl acetate, ethylene vinyl alcohol and mixtures thereof, wherein the amount of the at least one elastomer is from 60 wt % to 80 wt %; and
         (αii) at least one polymeric surfactant from 20 wt % to 40 wt %;
      (ii) a second aqueous phase comprising water as the medium, and
      (iii) a neutralizing phase containing at least one neutralizing agent; wherein the water medium is the continuous phase and the other solid components in the composition is the dispersed phase;
   (c) applying the aqueous thermoplastic polyolefin dispersion sealant coating composition from step (a) to at least a portion of the surface of at least one side of the skin member to form a wet film or coating of the thermoplastic polyolefin dispersion sealant coating composition on the surface of the skin member;
   (d) drying the wet coating from step (c) on the skin member surface at a temperature of from 50° C. to 100° C.; and
   (e) heating the dried skin member from step (d) at a temperature sufficient to form a film or coating of the aqueous thermoplastic polyolefin dispersion sealant coating composition on the seam of stitches in the skin member; wherein the film or coating seals the seam of stitches in the skin member.

3. The process of claim 2, wherein the aqueous thermoplastic polyolefin dispersion sealant coating composition is produced by admixing:
   (i) a first polymer phase component containing (αi) at least one elastomer and (αii) at least one polymeric surfactant;
   (ii) a second aqueous phase comprising water as the medium, and
   (iii) a neutralizing phase containing at least one neutralizing agent; wherein the water medium is the continuous phase and the other solid components in the composition is the dispersed phase; and wherein the admixture forms an aqueous thermoplastic polyolefin dispersion sealant coating composition.

4. The process of claim 2, wherein the composition is applied on the stitches of the seam in the skin member.

5. The process of claim 2, wherein the skin member is a synthetic skin member of polyvinyl chloride; thermoplastic urethane; and thermoplastic elastomer; and mixtures thereof.

* * * * *